United States Patent
Felix

(10) Patent No.: US 12,353,060 B2
(45) Date of Patent: Jul. 8, 2025

(54) LENS CLEANING DEVICE

(71) Applicant: Carrick Felix, Tempe, AZ (US)

(72) Inventor: Carrick Felix, Tempe, AZ (US)

(73) Assignee: Pinchers LLC, Phoenix, AZ (US)

( * ) Notice: Subject to any disclaimer, the term of this patent is extended or adjusted under 35 U.S.C. 154(b) by 306 days.

(21) Appl. No.: 17/858,474

(22) Filed: Jul. 6, 2022

(65) Prior Publication Data

US 2023/0007867 A1     Jan. 12, 2023

Related U.S. Application Data

(60) Provisional application No. 63/219,626, filed on Jul. 8, 2021.

(51) Int. Cl.
| | | |
|---|---|---|
| G02C 13/00 | (2006.01) | |
| B08B 1/00 | (2024.01) | |
| B08B 1/14 | (2024.01) | |

(52) U.S. Cl.
CPC .......... G02C 13/006 (2013.01); B08B 1/143 (2024.01)

(58) Field of Classification Search
CPC .............................. G02C 13/006; B08B 1/143
See application file for complete search history.

(56) References Cited

U.S. PATENT DOCUMENTS

| | | | | |
|---|---|---|---|---|
| 399,450 A * | 3/1889 | Gray | ................... | G02C 13/006 15/214 |
| 982,824 A * | 1/1911 | Johnson | ............... | G02C 13/006 15/214 |
| 3,048,878 A * | 8/1962 | Gray | .................... | G02C 13/006 222/215 |
| 3,056,154 A * | 10/1962 | Neal | ....................... | A47L 25/005 206/820 |
| D339,889 S | 9/1993 | Kessler et al. | | |
| 5,280,661 A * | 1/1994 | Brown | .................... | A47L 13/18 15/214 |

(Continued)

FOREIGN PATENT DOCUMENTS

| | | |
|---|---|---|
| CN | 207462160 U | 6/2018 |
| EP | 1042979 A1 | 10/2000 |
| JP | 2000201875 A | 7/2000 |

OTHER PUBLICATIONS

Lens cleaning cloth, posted Sep. 2, 2008 [online], [retrieved Mar. 20, 2023]. Retrieved from internet, https://www.amazon.com/Flents-Clear-Textured-Cleaning-Cloth/dp/B00EB1BOHQ/ref=sr_1_3?crid=1RL5WL8GBDLDM&keywords=lens+cloth +texture&qid=1679310277&sprefix=lens+cloth+texture%2Caps%2C123&sr=8-3 (Year: 2008).

(Continued)

*Primary Examiner* — Marc Carlson
(74) *Attorney, Agent, or Firm* — Jason T. Daniel, Esq.; Daniel Law Offices, P.A.

(57) ABSTRACT

A lens cleaning device includes an elongated member having a top surface, a bottom surface, a first end, a second end and a pair of opposing sides. The top surface is constructed from a soft and smooth fabric for cleaning eyeglass lenses, and the bottom surface is constructed from a moisture resistant material. A pair of pockets are be disposed along the distal ends of the bottom surface at locations adjacent to the first and second ends. The pockets including a shape and size for receiving a thumb and finger of a user. High friction nubs are provided along the bottom surface.

12 Claims, 2 Drawing Sheets

(56) References Cited

U.S. PATENT DOCUMENTS

| | | | | |
|---|---|---|---|---|
| 5,344,002 | A | * | 9/1994 | Baczkowski ........ G02C 13/006 206/5 |
| D354,594 | S | | 1/1995 | Reusswig |
| 5,694,659 | A | * | 12/1997 | Merrion ............... G02C 13/006 15/104.93 |
| D398,724 | S | | 9/1998 | Kohlruss et al. |
| D426,039 | S | | 5/2000 | Tintelnot et al. |
| D438,355 | S | | 2/2001 | Tintelnot |
| D445,227 | S | | 7/2001 | Tintelnot |
| D511,233 | S | | 11/2005 | Franco |
| D517,759 | S | | 3/2006 | Dretzka |
| 7,127,771 | B2 | * | 10/2006 | McDevitt ................. A46B 5/04 2/21 |
| D545,018 | S | | 6/2007 | Caruso et al. |
| D551,408 | S | | 9/2007 | Pung et al. |
| D633,672 | S | | 3/2011 | McKnight |
| D633,673 | S | | 3/2011 | McKnight |
| D640,025 | S | | 6/2011 | Wildeman |
| D659,324 | S | | 5/2012 | Davis |
| D673,744 | S | | 1/2013 | Vela et al. |
| D685,544 | S | | 7/2013 | Clarke |
| D685,551 | S | | 7/2013 | Myers |
| D693,530 | S | | 11/2013 | Seehoff |
| D714,506 | S | | 9/2014 | Yamada |
| D716,512 | S | | 10/2014 | Layevsky |
| 8,943,612 | B2 | * | 2/2015 | Jeong ................. A41D 19/0055 2/21 |
| D779,756 | S | | 2/2017 | Spitaletta |
| D792,042 | S | | 7/2017 | Parsons et al. |
| 10,264,875 | B2 | * | 4/2019 | Shaykova ............ A61C 15/046 |
| D881,472 | S | | 4/2020 | Vosbikian |
| D901,801 | S | | 11/2020 | Aragon et al. |
| D912,352 | S | | 3/2021 | Bender et al. |
| D912,353 | S | | 3/2021 | Bender et al. |
| 11,241,593 | B2 | * | 2/2022 | Maglinti .................. A61Q 1/14 |
| 2014/0215742 | A1 | * | 8/2014 | Eisenhut ................. A47L 13/16 15/244.4 |
| 2016/0250667 | A1 | * | 9/2016 | Hernandez Segura ...................... A46B 11/0003 15/104.94 |
| 2016/0256033 | A1 | * | 9/2016 | Anderson ............... B08B 1/143 |

OTHER PUBLICATIONS

Microfiber cloth, posted Feb. 2, 2019 [online], [retrieved Mar. 20, 2023]. Retrieved from internet, https://www.amazon.com/KSolars-Microfiber-Cleaning-Chemicals-Polishing/dp/B07NC7N87S/ref=sr_1_18_sspa? crid=1RL5WL8GBDLDM&keywords=lens%2Bcloth%Btexture&qid=1679310637&sprefix=lens%2Bcloth%2Btexture%2Caps%2C123&sr= (Year: 2019).

* cited by examiner

LENS CLEANING DEVICE

CROSS-REFERENCE TO RELATED APPLICATIONS

This application claims the benefit of U.S. Application Ser. No. 63/219,626 filed on Jul. 8, 2021, the contents of which are incorporated herein by reference.

TECHNICAL FIELD

The present invention relates generally to eyewear products, and more particularly to a lens cleaning device for glasses.

BACKGROUND

The statements in this section merely provide background information related to the present disclosure and may not constitute prior art.

There are numerous styles and types of commercially available eyeglass and sunglass lens cleaning devices. In general, these devices typically comprise of either a mechanical cleaner, a fabric cleaner embedded within a hard or soft sided case, or cleaners made entirely from cloth. Although useful, each of these devices have practical drawbacks for everyday use. For example, mechanical cleaners and case-based cleaners tend to be bulky in nature and are not easily carried on or about a person without exercising undue care to prevent the device from breaking.

Conversely, simple cloth cleaners are easily carried by a user in an inconspicuous manner but tend to be difficult to use as they lack a dedicated gripping area and hence are easily rumpled and/or slip from the user's hand while attempting to clean the eyewear. Moreover, because traditional cloth cleaners do not distinguish between surfaces (e.g., there is no inside or outside surface), they tend to become soiled quickly whereby dirt or oils from the hands of the user grasping one surface becomes applied to the glasses on subsequent cleanings.

The present invention, directed to a lens cleaning differs from the conventional art in a number of aspects. The manner by which will become more apparent in the description which follows, particularly when read in conjunction with the accompanying drawings.

SUMMARY OF THE INVENTION

The present invention is directed to a lens cleaning device. One embodiment of the present invention can include an elongated generally rectangular-shaped member having a top surface and a bottom surface. The top surface can be constructed from a soft and smooth fabric such as microfiber cloth, for example, that is suitable for cleaning eyeglass lenses.

In one embodiment, the bottom surface can be constructed from a moisture resistant material so as to not absorb oils or grime from a user's hands. A pair of pockets can be disposed along the distal ends of the bottom surface for receiving a thumb and finger of a user. High friction nubs can be provided along the bottom surface and the nubs and pockets can work together to allow a user to fold and manipulate the top surface about the front and rear surfaces of an eyeglass lens to be cleaned.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1:
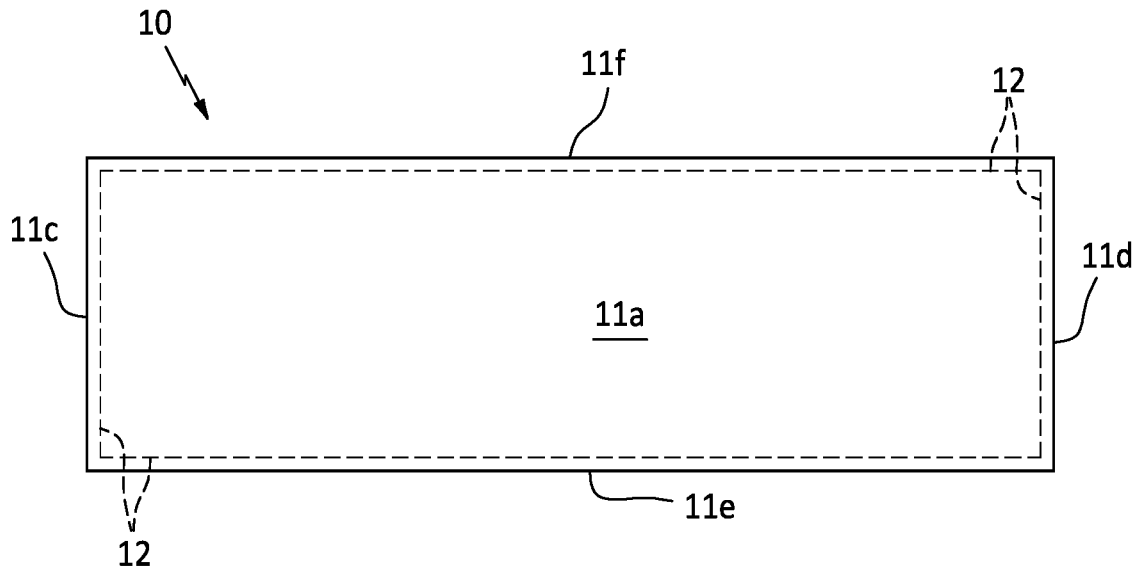
FIG. 1 is a top view of a lens cleaning device in accordance with one embodiment of the invention.
Figure 2:
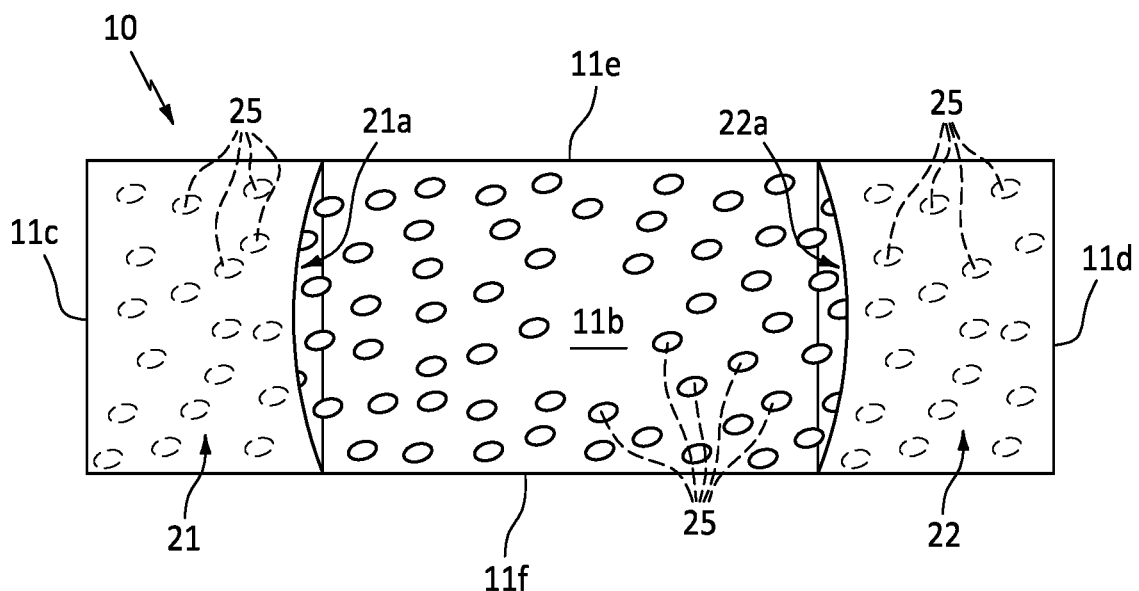
FIG. 2 is a bottom view of a lens cleaning device in accordance with one embodiment of the invention.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Definitions

As described throughout this document, the term "about" "approximately" "substantially" and "generally" shall be used interchangeably to describe a feature, shape or measurement of a component within a tolerance such as, for example, manufacturing tolerances, measurement tolerances or the like.

As described herein, a "high friction material" can include any number of different materials that, when secured to the main body, provide a greater level of resistance to movement than what the construction material of the main body affords alone. Several nonlimiting examples of high friction materials include, rubber and silicon, for example.

FIGS. 1-4 illustrate one embodiment of a lens cleaning device 10 that are useful for understanding the inventive concepts disclosed herein. In each of the drawings, identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

As shown in the drawings, one embodiment of the device 10 can include a substantially rectangular-shaped body member having a front surface 11a, a rear surface 11b, a first end 11c, a second end 11d and a pair of opposing sides 11e and 11f. The front and rear surfaces can preferably be constructed from individual pieces of cloth or other such material that are joined together via a seam connector 12, such as sewed stitches, for example, to form the illustrated shape.

The front surface 11a is designed and constructed to engage an eyeglass lens or other such device in order to clean and/or polish the same. In the preferred embodiment, the front surface 11a will preferably be constructed from a single piece of soft (e.g., not hard or firm to the touch) and smooth (e.g., having an even and regular surface or consistency; free from perceptible projections, lumps, or indentations) material that is suitable for routinely engaging an eyeglass lens without scratching, scuffing or damaging the same. Several nonlimiting examples include microfiber cloth, cotton, silk or satin fabrics, among others, for example.

The rear surface 11b is designed and constructed to be engaged by the hands of a user. In the preferred embodiment, the rear surface 11b will be constructed from a single piece of water-resistant fabric such as vinyl fabric, for example, so as to be resistant to oils and dirt which may be on the fingers of a device user.

In one embodiment, a pair of pocket sections 21 and 22 can be formed along each of the first and second ends 11c and 11d, respectively. Each of the pocket sections including openings 21a and 22a, for receiving a thumb and finger of a user operating the device to clean a lens. As shown, the pockets and pocket openings are aligned so as to receive the thumb and finger of a user in a direction that stretches the main body along its major axis (e.g., 11c-11d). Such a feature allows a user to securely grasp the device without causing creases, rumpling or other deformations to the front surface material 11a, in order to maintain a smooth crease-free surface when cleaning a lens.

In one embodiment, a plurality of gripping nubs 25 can be disposed along the bottom surface 11b and/or can be positioned within the pockets 21 and 22. In one embodiment, each of the nubs can be constructed from high-friction materials such as natural or synthetic rubber, for example, and can function to increase the grip between a users' fingers and the device in order to prevent or reduce the device body from slipping or sliding relative to the users fingers. Such a feature further working to allow the user to maintain the front surface 11a in a smooth crease-free orientation when cleaning a lens.

In one embodiment, optional padding such as cotton, foam or other soft malleable material may be positioned between the front surface 11a and the rear surface 11b. The padding can function to spread the pressing force imparted by a user's finger into the rear surface 11b over a greater surface area of the front surface 11a, so as to achieve in a larger compressive cleaning area on a lens being cleaned by the device.

Figure 3:
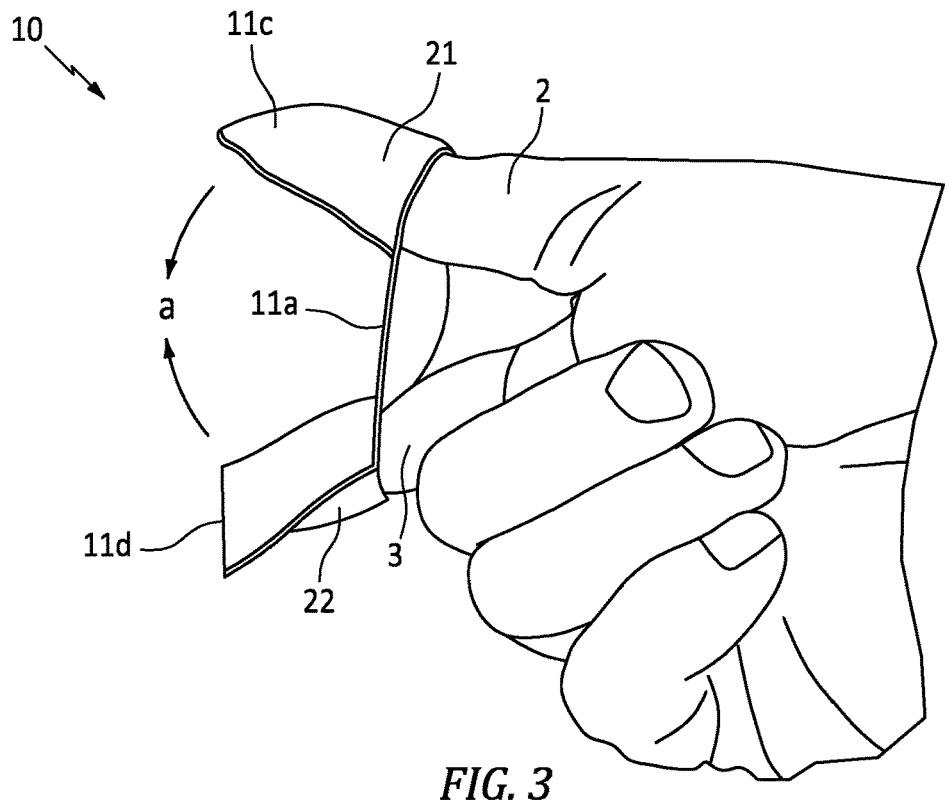
FIG. 3 is a perspective view of the lens cleaning device in operation, in accordance with one embodiment of the invention.
Figure 4:
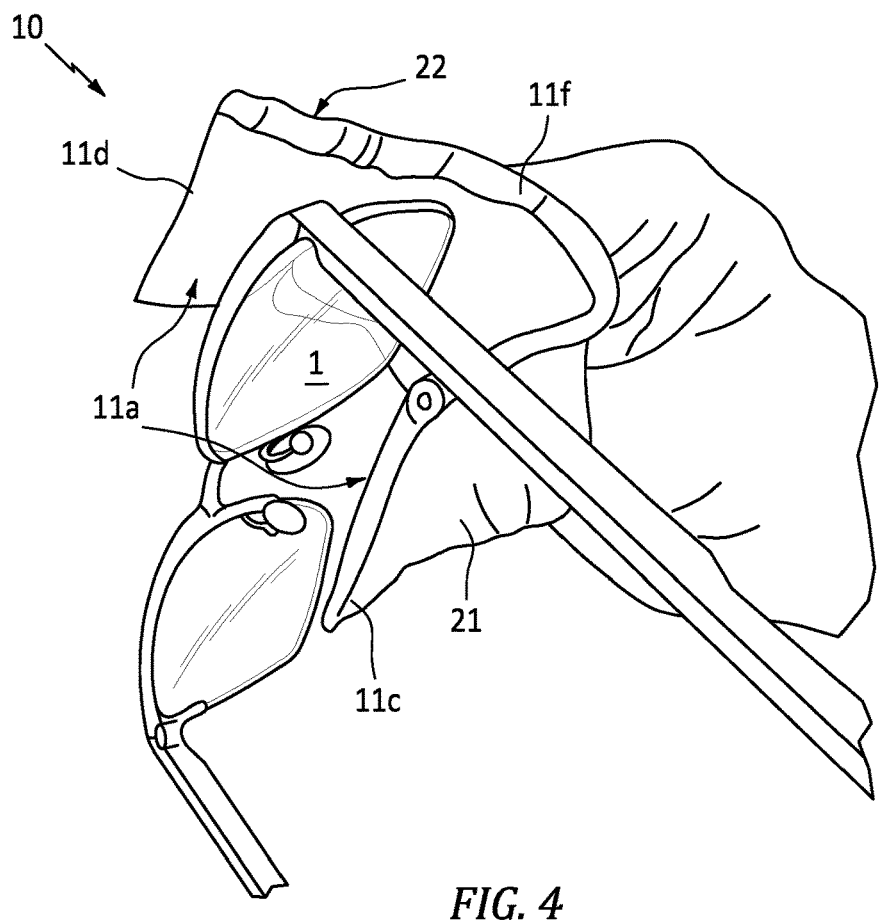
FIG. 4 is another perspective view of the lens cleaning device in operation, in accordance with one embodiment of the invention.

As shown best at FIGS. 3 and 4, a user can position the thumb 2 and finger 3 of one hand within the pockets 21 and 22 respectively. When so positioned, the user can bend (see arrow a) the device along the middle section whereby half of the front surface 11a is able to make contact with the front surface of an eyeglass lens 1 and the other half of the front surface 11a is able to make contact with the rear surface of the eyeglass lens. At this time, the user can squeeze the respective halves together and rub the lens from both sides.

As shown and due to the orientation of the pockets, when a user cleaning the lens the front surface 11a does not rumple and the only crease in the material is formed by the central bend. As such, the device remains smooth and flat, thereby ensuring a smooth flat contact with the lens so as to not scratch or scuff the same.

Although the above embodiments have been described as including separate individual elements, the inventive concepts disclosed herein are not so limiting. To this end, one of skill in the art will recognize that one or more individually identified elements may be formed together as one or more continuous elements, either through manufacturing processes, or through the use of a singular piece of material machined or sewed with the aforementioned components forming identifiable sections thereof. To this end, other embodiments are contemplated wherein the front and bottom surfaces are constructed from a single piece of material.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the term "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A lens cleaning device, comprising:
   an elongated main body member having a top surface, a bottom surface, a first end, a second end and a pair of opposing sides;
   a plurality of pockets that are disposed along the bottom surface of the elongated main body; and
   a plurality of gripping nubs that are disposed along the bottom surface of the main body,
   wherein the main body is constructed from a malleable material and is configured to bend along a middle portion.

2. The device of claim 1, wherein the plurality of pockets comprise:
   two pockets that are each configured to engage and receive one of a thumb or a finger of a user's hand.

3. The device of claim 1, wherein the top surface is constructed from a piece of soft and smooth material that is configured to engage and clean an eyeglass lens.

4. The device of claim 3, wherein in the bent orientation, the top surface is configured to engage and clean a front surface of the eyeglass lens and a rear surface of the eyeglass lens simultaneously.

5. The device of claim 1, wherein the bottom surface is configured to receive and engage a user's hand.

6. The device of claim 1, wherein the top surface is constructed from a first material that is configured to engage and clean an eyeglass lens.

7. The device of claim 6, wherein the bottom surface is constructed from a second material that is configured to engage a user's hand.

8. The device of claim 7, wherein the top surface and the bottom surface are secured together by stitching.

9. The device of claim 1, wherein each of the plurality of gripping nubs are constructed from a high friction material.

10. The device of claim 1, wherein the plurality of gripping nubs are positioned within each of the plurality of pockets.

11. The device of claim 10, wherein the plurality of gripping nubs are constructed from rubber.

12. The device of claim 1, wherein the bottom surface is constructed from a water resistant fabric that is configured to repel oils from a user's fingers.

* * * * *